United States Patent [19]

Gray et al.

[11] Patent Number: 4,565,728
[45] Date of Patent: Jan. 21, 1986

[54] SYSTEM AND METHOD FOR APPLICATION OF INTERNAL HEATING TO THERMALLY RESPONSIVE STRUCTURES

[75] Inventors: James B. Gray; Robert A. Joyce, both of San Diego, Calif.

[73] Assignee: Seam Team, Inc., San Diego, Calif.

[21] Appl. No.: 656,599

[22] Filed: Oct. 1, 1984

Related U.S. Application Data

[63] Continuation-in-part of Ser. No. 464,132, Feb. 4, 1983, Pat. No. 4,483,896.

[51] Int. Cl.⁴ .............................................. B32B 3/00
[52] U.S. Cl. ................................. 428/200; 156/304.4; 156/304.7; 156/502; 156/579; 428/62; 428/113; 428/256; 428/349; 428/913; 156/275.1
[58] Field of Search ................. 428/200, 62, 113, 256, 428/349, 913; 156/71, 272, 273.9, 275, 304.1, 304.3, 304.4, 304.6, 304.7, 306.6, 379.7, 502, 579; 219/10, 49, 10.53, 10.59, 10.75, 228, 234

[56] References Cited

U.S. PATENT DOCUMENTS

| | | | |
|---|---|---|---|
| 3,523,176 | 8/1970 | Hill | 219/245 |
| 3,619,333 | 11/1971 | Mender | 156/583 |
| 3,660,191 | 5/1972 | Shimota et al. | 156/152 |
| 3,972,768 | 8/1976 | Hill | 156/545 |
| 4,123,305 | 10/1978 | Krzeszowski | 156/71 |
| 4,483,896 | 11/1984 | Gray et al. | 428/200 |

FOREIGN PATENT DOCUMENTS 1282418 7/1982 United Kingdom ................. 428/62

Primary Examiner—Marion C. McCamish
Attorney, Agent, or Firm—Baker, Maxham, Callan & Jester

[57] ABSTRACT

A thermally responsive substrate includes an electric circuit extending throughout the substrate and providing multiple terminal pads through the substrate for the application of electrical current for heating the thermally responsive substrate. A tool for the application of electrical current to the terminals pads includes a device having multiple spaced apart contact probes for engaging selected terminal pads of the substrate.

21 Claims, 11 Drawing Figures

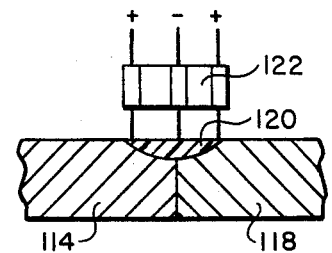
FIG. 9
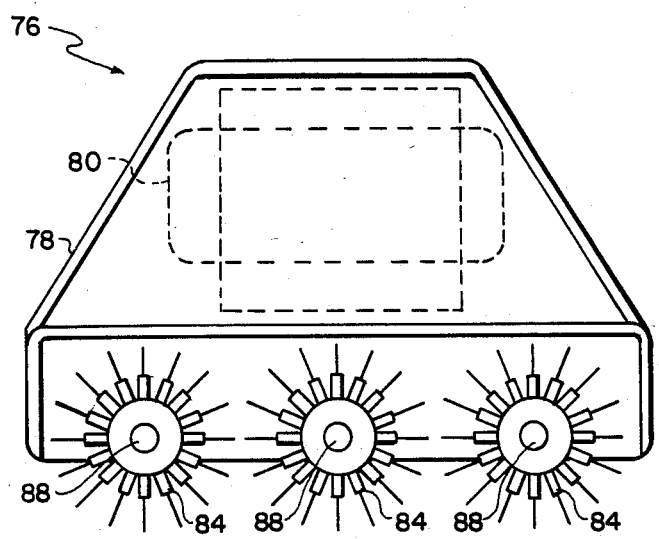
FIG. 4
FIG. 5
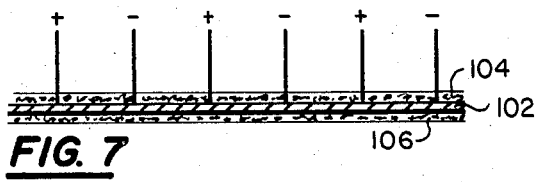
FIG. 7
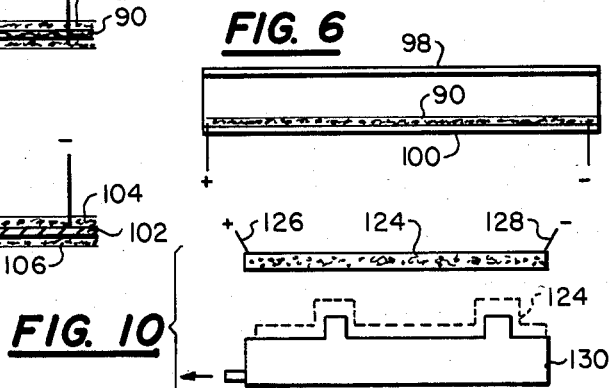
FIG. 6
FIG. 10
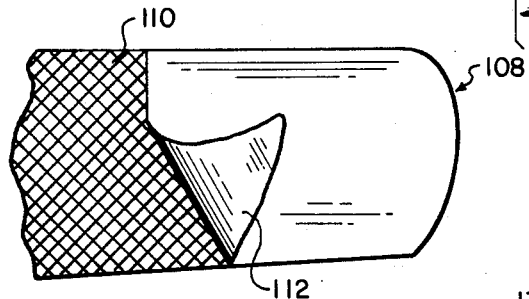
FIG. 8
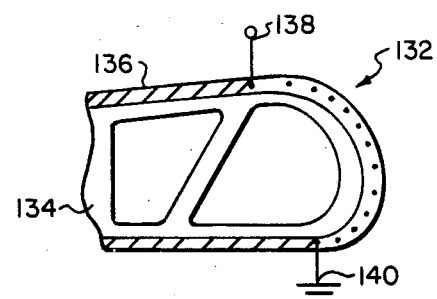
FIG. 11

SYSTEM AND METHOD FOR APPLICATION OF INTERNAL HEATING TO THERMALLY RESPONSIVE STRUCTURES

REFERENCE TO RELATED APPLICATION

This application is a continuation-in-part of our co-pending application Ser. No. 464,132 filed Feb. 4, 1983 entitled "Carpet Seaming Tape And Apparatus", by James B. Gray, Peter L. Jorgenson and Robert A. Joyce, now U.S. Pat. No. 4,483,896.

BACKGROUND OF THE INVENTION

The present invention relates to thermoplastic materials and pertains particularly to method and systems for internal application of heat to thermoplastic materials.

In our aforementioned patent application, we disclose and claim a carpet seaming tape wherein an electrical heating circuit is incorporated in the tape. This eliminates the traditional hot iron of the prior art for heating hot melt adhesive types of carpet seaming tape.

The present application covers improved features and applications of the basic technology as set forth in the prior application. The present application covers an extension of the basic technology, not only in the methods and apparatus of application but in the application of the technology to various industries.

Many fabricating structures utilize heat in one form or the other. Such structures as thermo responsive plastics of various types utilize heat for melting the plastic as with hot melted adhesives, for softening the plastic for shaping and molding purposes, and for curing the plastic to alter its characteristics such as strength, hardness and the like. There are various known plastics to which the basic concept of the present invention is applicable.

Accordingly, it is desirable that improved methods and apparatus for the application of thermal energy to thermally responsive materials be available.

SUMMARY AND OBJECTS OF THE INVENTION

It is the primary object of the present invention to provide improved methods and systems for the application of thermal energy to thermally responsive materials.

In accordance with the primary aspect of the present invention, substrates of thermally responsive material are provided with internal electrical resistance heating circuits having multiple terminals for the application of electrical current for internally heating the substrate.

In accordance with certain aspects of the invention, electrical circuits form physical structures of certain fabricating structures.

In other embodiments, the electrical circuits are formed by conductive mixtures embodied within the thermally responsive materials.

BRIEF DESCRIPTION OF THE DRAWINGS

The above and other objects and advantages of the present invention will become apparent from the following description when read in conjunction with the accompanying drawings wherein:

FIG. 4 is a side elevation view of the tool of FIG. 3;

FIG. 5 is a section view showing alternate embodiment of a substrate in accordance with the invention;

FIG. 6 is an elevation view in section illustrating a laminating technique and structure;

FIG. 7 is a view like FIG. 5 of still another embodiment of the substrate in accordance with the invention;

FIG. 8 is a partial view of an aircraft wing showing application of the laminating techniques of the present invention;

FIG. 9 is a section view showing a still further embodiment of the invention;

FIG. 10 is an elevational view illustrating application of the invention to a molding process; and FIG. 11 is a partial view in section showing a different application of the invention to an aircraft wing.

DETAILED DESCRIPTION OF A PREFERRED EMBODIMENT

Figures 1, 2, 3:
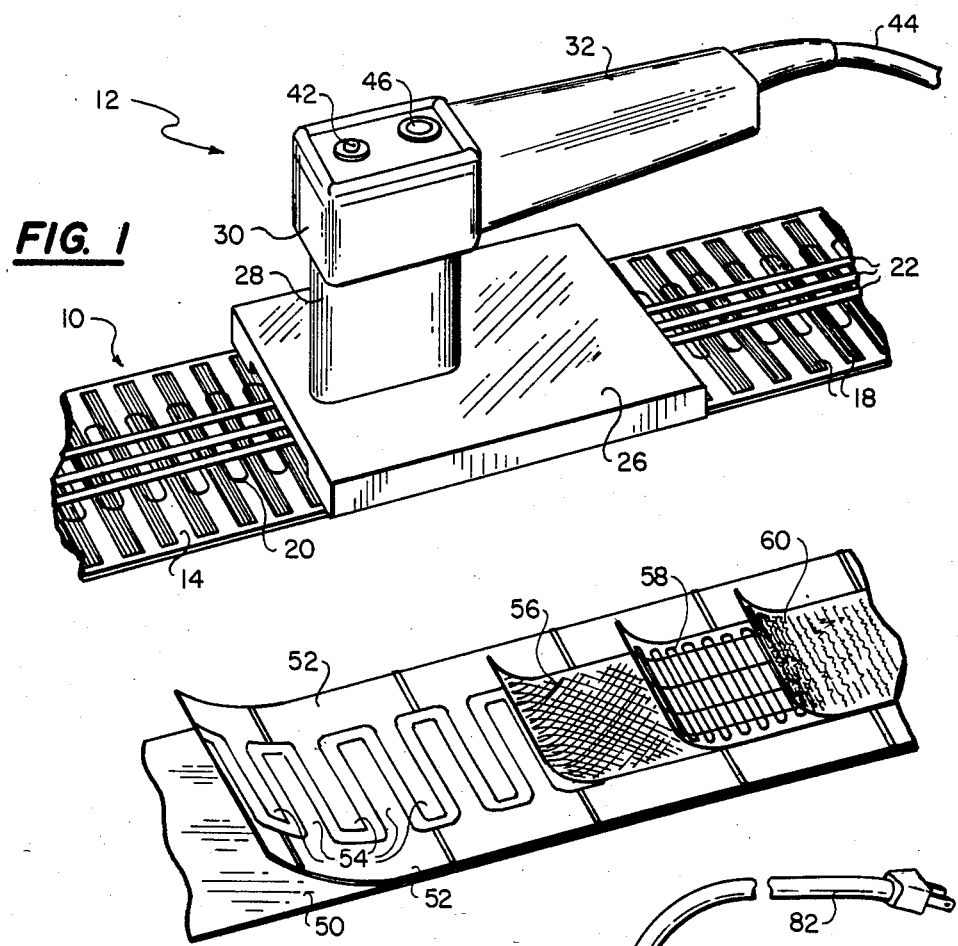
FIG. 1 is a view identical to FIG. 1 of the prior application.
FIG. 2 is a perspective view of alternate embodiment of a seaming tape.
FIG. 3 is a front elevation view illustrating an alternate embodiment of a tape and electrical application tool.

Turning to FIG. 1 of the drawings, there is illustrated a seaming tape in accordance with the present invention designated generally by the numeral 10 and an electrical activating device designated generally by the numeral 12 for activating the electric seaming tape.

The seaming tape comprises an elongated flat flexible strip of tape 14 which in the preferred embodiment is a heavy grade of paper preferably having a backing 16 of aluminum foil or the like for acting as a heat shield. The illustrated tape is of the size and general structure of a conventional carpet seaming tape and includes, placed on the top surface thereof, a series or continuous series of electrical heating circuits. The circuits in this embodiment comprise a plurality of transversely extending conductive strips 18, each of which in the preferred embodiment comprises a conductive ink or the like that is simply printed on the upper surface of the tape 14. The pattern of the electrical circuits as defined by the ink printing may take any number of forms, but preferably comprises elongated strips running from closely adjacent one edge of the tape to the closely adjacent opposite edge.

The ink or conductive strips may as previously explained take any number of forms but preferably extend across closely adjacent in a pattern that provides maximum uniform heating of the hot melt as will be subsequently explained. This may take the form of a plurality of closely adjacent straight narrow strips or curved strips, taking any number of forms.

Placed directly on top of the tape and over the conductive circuit is a reinforcing scrim 20 which in the usual construction takes the form of a web or a serpentine form of reinforcing cord such as a fiberglass or other suitable reinforcing cord. This may be attached to the backing by the hot melt or by other adhesive. A quantity of adhesive such as a plurality of beads of hot melt adhesive 22 extend along the length of the tape from and extend in parallel rows from closely adjacent one side to closely adjacent the opposite side. The usual tape preferably has on the order of about 8 rows or beads of such hot melt.

In this embodiment of the present invention, a foamed hot melt is preferably used. Due to the unique construction of the heating apparatus within the tape, a foamed hot melt has been found to be more economical in that it melts more quickly and provides a more complete bond with less bulk or volume of the hot melt adhesive. The present heating apparatus enables the use of a foamed hot melt whereas the prior hot iron method of seaming does not permit the use of a foamed hot melt. The foamed hot melt has a tendency to vaporize when a hot iron is applied directly to the hot melt as in the prior art devices and methods of tape seaming.

The tape thus provides its own heating elements built directly into the tape such that when the heating elements are activated, the hot melt melts to its tacky state and is thus ready for application to the backing of a carpet or the like.

A suitable activating apparatus 12 comprises a generally rectangular shoe or foot 26 secured to a pedestal member 28 on which is formed or secured a head 30 having a handle 32 extending backward therefrom. An electrical circuit is built within the activating apparatus and in the illustrated embodiment comprises a pair of spaced apart conductor shoes 34 and 36 extending downward from the bottom of foot 26 and spaced apart sufficient to engage the side edges of the tape in contact with the ends or terminals of the conductive resistive strips forming the resistive heating elements. Each of the contacts or conductive shoes 34 and 36 is connected by an electrical conductor 38 and 40 to a switch 42 in the head 30 which may be a pushbutton switch or the like and through a cord 44 to a source of electrical power. An indicator light 46 on the head 30 may be provided for showing activation of the circuit. In the preferred form, the activating apparatus uses a low voltage source of electrical current such as 12 or 24 volts being the preferred due to the efficiency thereof. This low voltage has been found by tests to be more than adequate and ensures safety of the device. A step down transformer may be provided for stepping the voltage down to the desired 12 or 24 volts from a standard 110 or 220 volt system.

In operation, the strip of tape is placed under the abuting edges of a pair of adjacent carpet segments or strips 46 and 48 with the base or foot 26 of the activating device placed over the tape to engage the conductors or contacts 34 and 36 with the tape terminal portions of the conductors adjacent the edges of the tape. The pedestal 28 extends upward between the adjacent edges of the carpet sections 46 and 48 with the handle and head thereof above the carpet such that the circuit can be completed by activating switch 42. This applies a voltage across the conductor terminals 34 and 36 and a flow of current by way of the conductive strips 18, thus generating a heat by means of the electrical current in the strips 18 causing the beads of hot melt to melt to a tacky state as the shoe 26 moves progressively along the length of tape. The carpet behind the activating tool is then pressed down with the edges together on top of the tape and permitted to bond thereto.

The melting temperature of the hot melt on the tape is preferably on the order of about 240° to 250° Fahrenheit (about 115° to 121° Centigrade) for the foamed hot melt. The same melt unfoamed would melt in the neighborhood of about 327° Fahrenheit (about 164° C.). Also, the foamed melt permits the use of approximately half of the hot melt as would be required for non-foamed hot melt.

The resistance circuit on the tape is preferably on the order of around 24 to 30 ohms in resistance for a 24 V system. This would be approximately in the range of about 8 to 10 ohms for a 12 V system.

Referring now to FIG. 2 of the drawings, an alternate construction of the tape is shown wherein a tape strip or backing 50 as in the previous embodiment has an electrical conductive material in this instance in the form of a plurality of panels of a conductive foil, each identical in construction and having a pair of fingers 54 extending outward and overlapping like fingers of the opposite panel. The panels are arranged to provide interrupted terminal pads extending along each side edge of the paper with a serpentine gap formed between the overlapping fingers 54. This space between the pads and fingers are bridged by 56 of a non-woven conductive carbon fiber matting 52 formed of conductive fibers such as carbon fibers. This provides the electrical resistance conductive network on top of which is placed a reinforcing scrim 56 and on top of that is placed a quantity, such as a layer of hot melt adhesive. The carbon matting 56 may also be coated with a metal such as nickel or the like, which may be flame sprayed onto the carbon fibers. Such carbon fabric or material is commercially available as a reinforcement for plastics and the like.

This construction and configuration of the circuit patterns has found to provide a more uniform heating and melting of the hot melted adhesive. It will be appreciated that as in previous embodiment and as explained when electrical voltage is applied across the terminals, a circuit is established between the terminals for the flow of current along the path of shortest resistance. Thus, current will flow through the resistance circuit of the tape along various paths between the terminal pads that are engaged by the two spaced apart shoes of the electrical applicating tool. The necessary resistance in the circuit to establish the necessary heat can be adjusted by known techniques.

Referring to FIG. 3, a still further embodiment of the tape is illustrated in use together with an alternate embodiment of an activating apparatus. As illustrated in FIG. 3, two carpet sections 62a and 62b, each having the usual woven backing 64a and 64b, are abutted together along a joint 66. A seaming tape comprising a backing 68 and a quantity such as a fairly thin uniform layer of hot melt adhesive 70 carried by the backing 68 is disposed below the joint 66 and centered as desired. The seaming tape may also include a reinforcing scrim 72 which may be disposed either within the hot melt adhesive or between the adhesive and the backing 68. This combination then rests on a carpet padding 74 as usual.

The hot melt adhesive 70 is a composition that includes a conductive/resistive circuit built into the adhesive. Such a circuit can be built in such as by doping the adhesive material by means of conductive particles such as metal particles, carbon particles, or combinations thereof to provide a conductive resistance circuit that will generate with an appropriate amount of current, sufficient heat to melt the adhesive. Preferably, the layer of adhesive is prepared such that the entire surface thereof defines terminal means such that engagement with an electrically conductive probe connected to a source of current will induce a current flow within the tape. As in the previous embodiment, current will flow through the circuit established between positive and negative terminals which are connected to the adhesive.

The activating apparatus in this embodiment is schematically illustrated in FIG. 3 and comprises generally a pinwheel electrical probe device. The apparatus designated generally by the numeral 76 comprises a housing 78 in which is located or mounted a transformer 80 which is connected to a source of 110 or 220 AC current such as by a cord or the like 82. The transformer converts the 110 AC current to something on the order of 12, 18 or 24 volts as desired. This current is then applied through a circuit schematically illustrated to a plurality of rotatably mounted electrically conductive pinwheels arranged in pairs 84 and 86. In the preferred arrangement, alternate ones of the pinwheels are alternately poled such as negative and positive. These pinwheels are rotatably mounted on a shaft 88 which is mounted within the housing 78. The pinwheels are separated by insulating spacers 90, alternate ones of which have conductive surfaces or rings 92 and 94 connected respectively to positive and negative conductors 96 and 98 which are in turn connected through the transformer to the source of electrical current. The electrical circuit preferably has indicators such as lights and the like and the usual on/off switches for establishing and determining the condition of the circuit.

In operation, the carpet to be seamed is positioned as illustrated with the seam disposed directly over the tape to be activated. The seam is aligned and positioned as desired and a pinwheel device is selected and placed anywhere along the tape where it is desired to melt the hot melted adhesive. The pinwheel device rests on the carpet with the conductive pins extending through the carpet through the backing 64 and engages the underlying conducting adhesive layer 70 and when activated conducts current through the adhesive through various paths therein between adjacent positive and negative poles of the pinwheels. The flow of current through the various paths within the adhesive melts the adhesive to its tacky state and permits working of the seam of the carpet to establish the desired bond. The pinwheel device can be rolled along the seam at a desired rate to achieve the desired melt of the hot melt. Should it be necessary to re-melt or re-work the seam, the pinwheel device is merely placed on the carpet over the seam and rolled along the seam at a rate to melt the hot melted adhesive as desired.

As shown in FIG. 4, the pinwheel device 76 may employ a plurality of rows of the pinwheels as illustrated. Other alternative constructions may utilize a single row of pinwheels or may selectively space the pinwheels any different distance apart as desired. Alternatively, the pins may be fixed to the bottom of the device and the device itself simply placed on the tape to establish the contact and once the adhesive is melted to the desired consistency, the device moved to another location. Many other alternatives are also possible within the spirit and scope of the invention.

The principles of the present invention may be applied to any number of different thermoplastic and/or thermally responsive materials wherein heat can be applied to the material to change the state of the material. A variety of thermoplastic materials are available which can be treated in accordance with the invention. Various hot melt adhesives are well suited to the application of the principles of the present invention.

A number of thermoplastic materials are available which may be treated in accordance with the invention. For example, materials which require heat for softening so that it can be molded into various shapes and configurations may be treated in accordance with the invention by the embodiment of electrical conductive resistance circuits within the body of material thereby forming a thermal responsive substrate to which electrical current can be applied to change the state of the material.

Various thermosetting materials are also available which may be embodied with a conductive resistance circuit such that electrical current can be applied to sheets of the material or other bodies of the material for curing the material. In each instance, the conductive resistance circuit can be selected to have other characteristics that enhance the materials. For example, reinforcing fibers of carbon or other conductive materials may be embodied in a body of plastic to form the basic conductive resistance circuit and also serve the function of reinforcing the material.

Thermosetting or thermocuring material may also be treated in accordance with the invention by the embodiment of electrical conductive resistance circuits therein such as doping the material with a conductive powder. The appropriate amount of current may then be applied to the body to thereby generate sufficient internal heat to enhance and control the rate and/or degree of curing and the like. In other embodiments, the conductive circuit may serve additional functions after the initial formation of the material or the like.

Referring to FIG. 5 of the drawing, there is illustrated a conductive fabric sheet 90 which is impregnated with a hot melt adhesive 92 which forms layers or portions of layers on both sides of the sheet 90. The sheet 90 may be in the form of either woven or non-woven conductive fibers such that when a plurality of conductive pins 94 and 96, for example, are applied to the fabric, a flow of current is established in the sheet of material between the oppositely poled conductive members thereby generating the heat for melting the hot melted adhesive. The sheet of material can then be utilized as shown in FIG. 6 placing a sheet of the material 90 between a pair of thin sheets 98 and 100 of another material to form laminates and the like. Such arrangements can be used for the installation of paneling in buildings, for the formation of laminated structures such as plywood and the like, or composites of plastic laminates and the like.

Referring to FIG. 7, an alternate embodiment of a substrate embodying the invention is illustrated. In this embodiment, a support structure such as a panel of plastic or wood or other structural panel is coated on both sides with a coating 104 and 106 of conductive resistive impregnated hot melted adhesive. The circuit embodied in the adhesive is then simply activated by the application of electrical current to the respective surfaces such as by the means of a pinwheel device or other suitable device as desired. Once the hot melted adhesive is activated, the panel may be applied to other panels or the like.

Referring to FIG. 8, there is illustrated the application of the invention to the formation of wing structures or the like for aircraft. A wing designated generally by the numeral 108 has the usual spar and rib structure or the like and may be covered by a thin veneer covering of a woven fabric or sheet of metal or plastic, including a hot melted impregnated non-woven fiber panel 110. The electrical circuit for melting the adhesive may then be activated by the application of electrical current by engaging various areas of the surface of the panel 110 by electrical conductors connected to a source of electrical current. The electrical conductors may take any number of forns such as the pinwheel device of FIGS. 3 and 4. As the adhesive is melted, a sheet or covering 112 may be applied to the surface thereby forming high strength laminated structures for wings and the like.

Referring to FIG. 9, another application of the principles of the invention are illustrated wherein, for example, wallboard panels 114 and 118, such as gypsum board or the like, are abutted together to form a joint with a strip 120 of a resistive conductive hot melted adhesive placed in the joint and activated by means such as a pinwheel device 122. The hot melted adhesive may be impregnated with various plaster materials and coloring to match surrounding materials. This provides a quick setting minimal shrinkage bond. Such use would considerably reduce the labor and cost of construction.

Referring to FIG. 10, an alternate application is illustrated wherein a panel of a thermoplastic material 124, which must be heated to be shaped to a desired configuration, is impregnated with conductive materials to form a conductive resistance circuit internally thereof. Positive and negative electrical probes 126 and 128 are applied to the panel to induce current flow within the panel for inducing heat for softening the panel. The panel is then placed on a desired mold such as a vacuum mold or the like 30 and the panel subsequently shaped while soft to form the desired shaped device.

Referring to FIG. 11, a still further application of the principles is illustrated wherein a portion of the cross-section of an aircraft wing is illustrated. In this embodiment, a wing section designated generally by the numeral 32 comprises a frame support structure 134 on which it is formed a skin or covering 136. The skin or covering 136 is preferably formed such as by one of the previous described techniques of lamination or the like with an electrical conductive resistance circuit established in the skin or covering 136. Conductors may be attached at various points or locations such as a conductor 138 to a source of electrical current with a ground 140 connected such that an electrical circuit is established between the two conductors. Upon the application of voltage across the conductors, a current is established in the circuit flowing between the two conductors 138 and 140. This flow of current within the resistance circuit, such as along the leading edge of the wing, generates sufficient heat to prevent the formation of icing and the like on the leading edge of the wing. Thus, various applications of the principles are possible.

Other applications of the principles of the invention, the use of hot melted adhesives in the forming of pipe and other plumbing joints such that the adhesive can be melted and the pipe joints uncoupled when desired. Such application can employ either a conductive adhesive for application to non-conductive pipes or a non-conductive hot melt to conductive pipes.

The present invention was devised primarily for use with plastics. Plastics fall under two basic categories of thermoplastics or thermosetting plastics. Thermoplastics can be heated, formed, reheated, and reformed many times, much like metals. Thermosetting plastics, on the other hand, cannot be reformed after they harden or have their intrinsic shape, much like ceramics.

Examples of thermoplastics include acrylic, polycarbonate, styrene, and vinyls. These are frequently produced in sheets or panels and can be produced with a conductive/resistance circuit built in such as with conductive powders or fibers or combinations thereof.

Examples of thermosetting plastics include epoxy, polyester resin, and silicone. These are typically produced as a liquid or paste and heat is used to cure it. The liquid or paste can be doped with a conductive ink or powder or combination to provide the electrical heating circuit. The paste or liquid can also be applied to conductive mats or screens of conductive fibers. Also, fibers can be mixed with the material during application. The fibers can be any material such as carbon, metal or combinations, including carbon or metal coated non-conductive fibers.

Other arrangements in structures and components of the tapes, etc. may be made. For example, any flat or planar conductive support area can be activated by the pinwheel device. Conductive papers and foils may act as support for beads of non-conductive plastic such as hot melt and the like. The entire surface area of the paper or foil acts as a terminal, and engagement by the pinwheels determines the current paths.

The resistance of the circuit will depend upon the amount and character of the conductive powder mixed with the plastic material. The ratios of powder to material will generally vary from between one part powder to five parts plastic up to one to one, depending upon the material and the desired resistance.

While we have illustrated and described our invention by means of specific embodiments, it is to be understood that numerous changes and modifications may be made therein without departing from the spirit and scope of the invention as defined in the appended claims.

We claim:

1. A structural forming member comprising:
a thermally responsive substrate;
electrical resistance circuit means extending throughout the area of said substrate and including multiple terminal means located at multiple positions throughout said substrate for selective application of electrical current to selective areas of said circuit means for heating selective areas of said substrate.

2. The forming member of claim 1 wherein:
said thermally responsive substrate is a thermoplastic hot melt adhesive.

3. The forming member of claim 1 wherein said electrical resistance circuit means is embodied within said thermally responsive substrate.

4. The forming member of claim 3 wherein said thermally responsive substrate is mounted on a structural substrate.

5. The forming member of claim 4 wherein said thermally responsive structural substrate defines an elongated bonding tape; and
said terminal means comprises conductive foil strips extending along opposite side edges of said tape.

6. The forming member of claim 3 wherein said electrical circuit means comprises conductive particles distributed throughout said thermally responsive substrate.

7. The forming member of claim 6 wherein said thermally responsive substrate is a thermoplastic.

8. The forming member of claim 7 wherein said substrate is a hot melt adhesive.

9. The forming member of claim 6 wherein said substrate is a thermosetting plastic.

10. The forming member of claim 3 wherein said electrical circuit means comprises a quantity of conductive fibers distributed throughout said thermally responsive substrate.

11. The forming member of claim 10 wherein said substrate is a thermoplastic.

12. The forming member of claim 11 wherein said thermoplastic is a hot melt adhesive.

13. The forming member of claim 10 wherein said substrate is a thermosetting plastic.

14. A system for forming structures from materials including thermally responsive plastics, comprising:
a thermally responsive substrate;
electrical resistance circuit means extending throughout the area of said substrate and including terminal means for selective application of electrical current to selective areas of said circuit means for heating selective areas of said substrate; and
electrical means having a plurality of contact means for selectively engaging said terminal means for applying electrical current to said selective areas of said circuit means for heating selected areas of said thermally responsive substrate.

15. The system of claim 14 wherein said electrical means comprises:
a housing having a top and a bottom; and
a plurality of contact pins extending downward from said bottom for engaging said terminal means.

16. The system of claim 15 wherein said contact pins are mounted on and extend radially outwardly from a plurality of rotatably mounted wheels.

17. An electrical device for the selective application of electrical current to selective areas of a thermally responsive substrate having a plurality of spaced terminal means, said electrical device comprising:
a housing having a top and a bottom;
a plurality of conductive pinwheels rotatably mounted in said housing and positioned adjacent said bottom with a plurality of pins of said pinwheels extending from said bottom for selective engagement with terminals on a substrate; and
a source of electrical current for said pins of said pinwheels.

18. A method of fabricating structures from materials including thermally responsive plastics, comprising the steps of:
selecting a thermally responsive substrate;
providing said substrate with electrical resistance circuit means extending substantially throughout the area of said thermally responsive substrate;
providing said circuit means with multiple terminal means for application of electrical current to said circuit means; and
applying electrical current to selective areas of said circuit means for heating selective areas of said thermally responsive substrate.

19. A method according to claim 18 wherein said circuit means comprises conductive material embodied within said substrate; and
said step of applying electrical current to said circuit means includes selecting multiple contact members and engaging selected terminal means of said circuit means for establishing electrical current in paths between said selected terminal means.

20. A method according to claim 19 wherein said thermally responsive substrate is a hot melt adhesive; and
comprising the further steps of applying said substrate to a joint between two members for adhesively bonding said two members together.

21. A method according to claim 19 wherein said thermally responsive substrate is a thermoplastic member; and
further comprising the step of selecting a mold and plastically deforming said thermoplastic member to fit said mold.

* * * * *